United States Patent
Itoh

(10) Patent No.: US 6,418,321 B1
(45) Date of Patent: Jul. 9, 2002

(54) TRANSMISSION POWER CONTROLLER

(75) Inventor: Katsutoshi Itoh, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/225,300

(22) Filed: Jan. 5, 1999

(30) Foreign Application Priority Data

Jan. 5, 1998 (JP) .......................................... 10-000144

(51) Int. Cl.[7] .............................. H04B 1/06; H04B 7/00
(52) U.S. Cl. ........................ 455/522; 455/504; 455/69
(58) Field of Search ........................ 455/522, 423–425, 455/10, 501–506, 69, 232.1–250.1; 375/224

(56) References Cited

U.S. PATENT DOCUMENTS

| | | | | | |
|---|---|---|---|---|---|
| 5,265,119 | A | * | 11/1993 | Vembu ........................ | 455/522 |
| 5,305,468 | A | * | 4/1994 | Bruckert et al. .............. | 455/69 |
| 5,386,589 | A | * | 1/1995 | Kanai .......................... | 455/423 |
| 5,852,782 | A | * | 12/1998 | Komatsu ..................... | 455/522 |
| 5,878,350 | A | * | 3/1999 | Nakamura et al. .......... | 455/442 |
| 5,960,361 | A | * | 9/1999 | Chen ........................... | 455/522 |
| 6,032,052 | A | * | 2/2000 | Richardson ................. | 455/522 |
| 6,058,107 | A | * | 5/2000 | Love et al. .................. | 370/332 |
| 6,138,033 | A | * | 10/2000 | Kitade et al. ................ | 455/522 |
| 6,163,707 | A | * | 12/2000 | Miller ......................... | 455/522 |
| 6,163,708 | A | * | 12/2000 | Groe ........................... | 455/522 |
| 6,169,907 | B1 | * | 1/2001 | Chang et al. ................ | 455/522 |
| 6,173,188 | B1 | * | 1/2001 | Kim ............................ | 455/522 |
| 6,181,738 | B1 | * | 1/2001 | Chheda et al. .............. | 375/224 |
| 6,185,432 | B1 | * | 2/2001 | Vembu ........................ | 455/522 |

\* cited by examiner

*Primary Examiner*—Edward F. Urban
*Assistant Examiner*—Charles Craver
(74) *Attorney, Agent, or Firm*—Venable; Michael A. Sartori

(57) ABSTRACT

A transmission power controller includes a transmission amplifier located in a first station and having an adjustable gain. The transmission amplifier controls the power transmitted from the first station to a second station in accordance with a power control information signal transmitted from the second station. The transmission power controller comprises a power control information extracting circuit, and up/down decision circuit, and a filter interposed between the up/down decision circuit and the transmission amplifier. The filter extracts low frequency band components from sequential output signals of the up/down decision circuit, generates command signals, and applies the command signals to the transmission amplifier to control the gain of the transmission amplifier.

13 Claims, 10 Drawing Sheets

TRANSMISSION POWER CONTROLLER

BACKGROUND OF THE INVENTION

1. Field of the Invention

This invention relates to a transmission power controller for controlling the transmission power of a mobile station comprising part of a radio communication system. More specifically, it relates to a transmission power controller for use with a code division multiple access (CDMA) communication system.

2. Description of the Background Art

The CDMA communication system has been standardized by the Telecommunications Industry Association TIA) for use in North America and has adapted spread spectrum communication technology. In this system, since a plurality of mobile stations share the same frequency band, signals transmitted by several such stations tend to interfere with each other resulting in degradation of the quality of the signal transmitted by each of the mobile stations. To overcome this problem, a closed-loop power control operation is employed which adjusts the transmission power of each mobile station. Specifically, power control information is transmitted from a base station to each mobile station to minimize interference between the mobile stations.

Referring to the block diagram of FIG. 2, the following is an explanation of the power control operation of a conventional CDMA communication system comprising a base station 100, a mobile station 200, and a base station controller 300.

The base station 100 includes a demodulator 101, a signal-to-noise (S/N) power measuring circuit 102, a power up/down discriminator 103, a power control information multiplexer 104 and a modulator 105. The demodulator 101 demodulates a received signal transmitted from the mobile station 200 via a receiving amplifier 106, and the S/N power measuring circuit 102 measures the received power level of the received signal provided by the demodulator 101.

The power up/down discriminator 103 determines whether the received power level is in a proper or improper status by comparing the received power level with a threshold level provided by a threshold set-up circuit 303 of the base station controller 300 and outputs a power control signal. The threshold level is determined by calculating an error rate of the received signal. For example, when the received power level exceeds the threshold level, the power up/down discriminator 103 outputs a power control bit having a logical value such as "−1", which commands a decrease in the transmission power of the mobile station 200. In contrast, when the received power level does not exceed the threshold level, the power up/down discriminator 103 outputs a power control bit having a logical value such as "+1", which commands an increase in the transmission power of the mobile station 200. The power control information multiplexer 104 inserts the power control bit into the transmission signal to be transmitted, the transmission signal is modulated to a spread-spectrum signal for the CDMA communication system by the modulator 105, and the signal is transmitted to an antenna (not shown) via an amplifier 107.

Each mobile station 200 comprises an amplifier 200a, a demodulator 201, a power control information extracting circuit 202, a decoder 203, an up/down decision circuit 204, a transmission amplifier 205, and a transmission circuit 206.

The demodulator 201 demodulates the spread-spectrum signal transmitted from the base station 100 via the receiving amplifier 200a to a baseband signal. The power control information extracting circuit 202 extracts the power control bit from the demodulated received signal. The decoder 203 decodes the demodulated received signal to a voice or data signal. The transmission amplifier 205 is a variable gain amplifier which change its gain as a function of the command signal provided by the up/down decision circuit 204.

The up/down decision circuit 204 is an accumulator which sums the signals received from the power control information extracting circuit 202 during a series of signals received from the base station 100. For example, if five signals, +1, +1, −1, +1, +1 are received from the poser control information extracting circuit 202, the up/down decision circuit 204 outputs these command signals, +1, +2, +1, +2, +3, sequentially to the transmission amplifier 205. In response, the transmission amplifier 205 would increase the transmission power by 3dB. In the conventional CDMA communication system, the power control operation is periodically performed every 1.25 micro-seconds. As a result, the mobile station 200 frequently controls the transmission power in accordance with the power control bit.

The base station controller 300 comprises a decoder 301, an error rate measuring circuit 302, a threshold set-up circuit 303 and a coder 304. The decoder 301 decodes the received demodulated signal, provided by the demodulated 101 of the base station 100, to a voice or data signal. The voice or data signal is supplied to the error rate measuring circuit 302 which measures the error rate of the voice or data signal. The threshold set-up circuit 303 determines a threshold level, based on the error rate, which is the transmission power of the mobile station 200 to satisfy the predetermined quality of speech or data signal. The signal threshold level is supplied to the power up/down discriminator 103 of the base station 100. The coder 304 codes a voice or data signal to be transmitted to the mobile station 200.

FIG. 3 is a graph having an abscissa divided into 73 divisions each designating an instant T(n), defined as a sample time, at which the base station 100 transmits a "1" or a "+1" signal to the mobile station 200 where it is received by the power control information extracting circuit 202 and inputted to the up/down decision circuit 204. The ordinate of FIG. 3 shows variations in the power transmitted by the mobile station 200 to the base station 201, in decibels, at each instant of time T(n). The graph of FIG. 3 illustrates the operation of a typical CDMA communication system in which the power transmitted by the mobile station 200 changes in 1 dB increments at the following sample times: (1) At sample times T(1–10), the transmission power alternates between 1 dB and 0 dB (2) At sample times T(20–53), the transmission power alternates between 10 dB and 11 dB; and (3) At sample times T(60–73), the transmission power alternates between 4dB and 5dB.

During the sample times T(11–21), the base station 100 transmits a series of only "+1" signals and therefore the power transmitted by the mobile station 200 gradually increases to 11dB, and during the sample times T(53–60), the base station 100 transmits a series of only "−1" signals and therefore the power transmitted by the mobile station 200 gradually decreases to 4dB.

It is desirable to keep a fixed transmission power level at the mobile station 200 if the transmission power level matches the threshold level. However, in the conventional CDMA communication system, as shown in FIG. 3, even when the transmission power level matches the threshold level, the mobile station is forced to change transmission power because the base station 100 always sends a transmission power control bit that commands either an increase or a decrease in the transmission power. That is, the power being transmitted by the mobile station 200 is always being changed. As a result, the signal received by the base station 100 does not have a constant received power level.

SUMMARY OF THE INVENTION

It is an object of the present invention to provide a transmission power controller that is capable of suppressing deviation in the transmission power at the mobile station. It is an another object of the invention to provide a transmission power controller that is capable of not only suppressing such deviations but also capable of providing a quick response to change in the transmission power when the transmission power level does not match the threshold level.

To accomplish these objectives, a transmission power controller having a transmission amplifier for adjusting transmission power based on power control information signal transmitted from a base station is provided which comprises;

a power control information extracting means for extracting said power control information signal, an up/down decision means for producing a command signal to control a gain of said transmission amplifier in response to said power control information signal, and a filtering means for extracting a row frequency band signal from said command signal and for controlling a gain of said transmission amplifier based on said extracted row frequency band signal.

BRIEF DESCRIPTION OF THE DRAWINGS

These and other objects and features of the present invention will become more apparent from consideration of the following detailed description taken in conjunction with the accompanying drawing in which.

DESCRIPTION OF THE PREFERRED EMBODIMENTS

Figure 1:
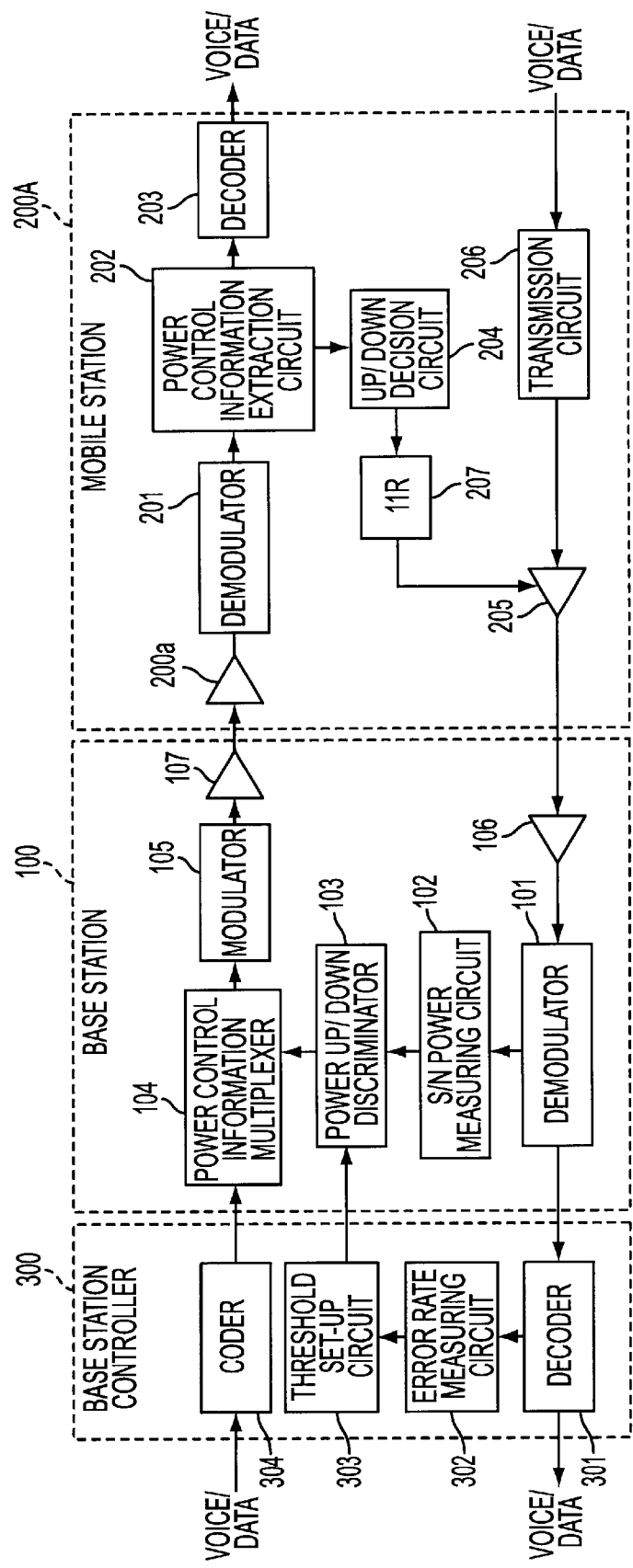
FIG. 1 is a block diagram showing a CDMA communication system according to a first embodiment of the invention.
Figure 2:
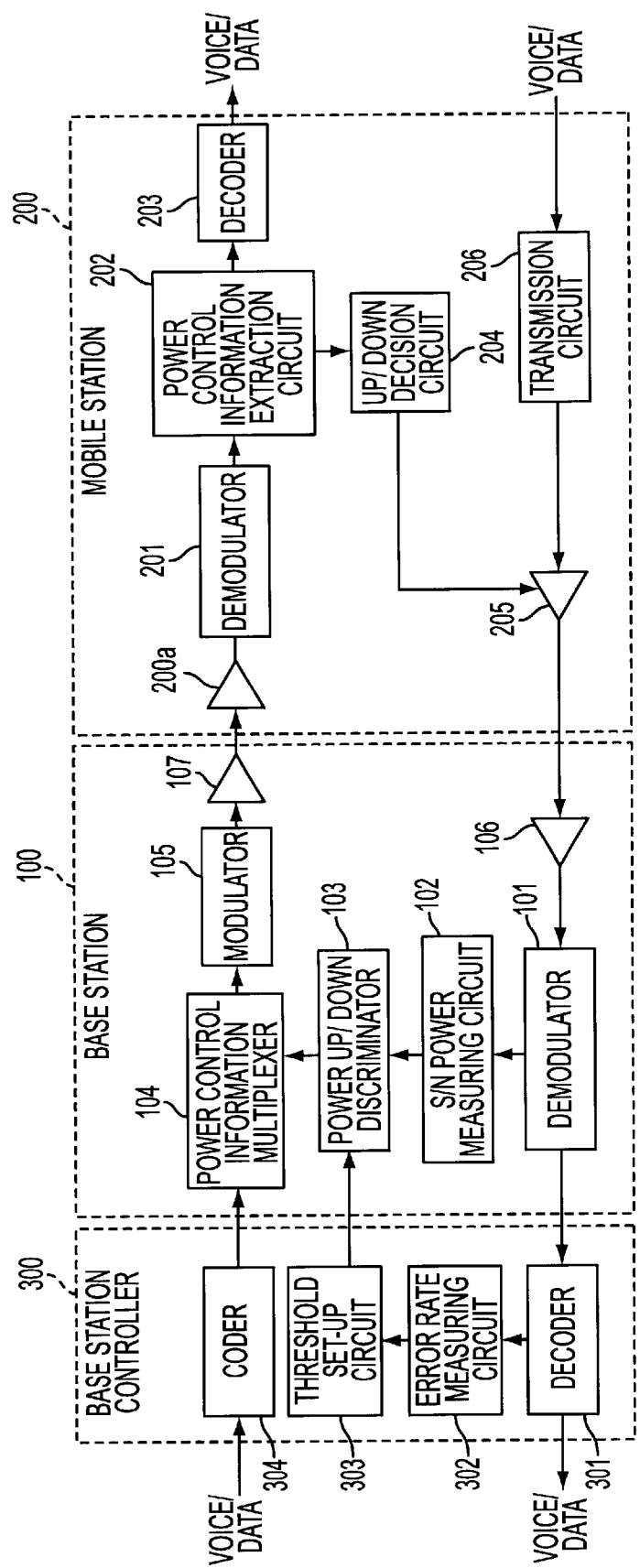
FIG. 2 is a block diagram showing a conventional CDMA communication system.
Figure 3:
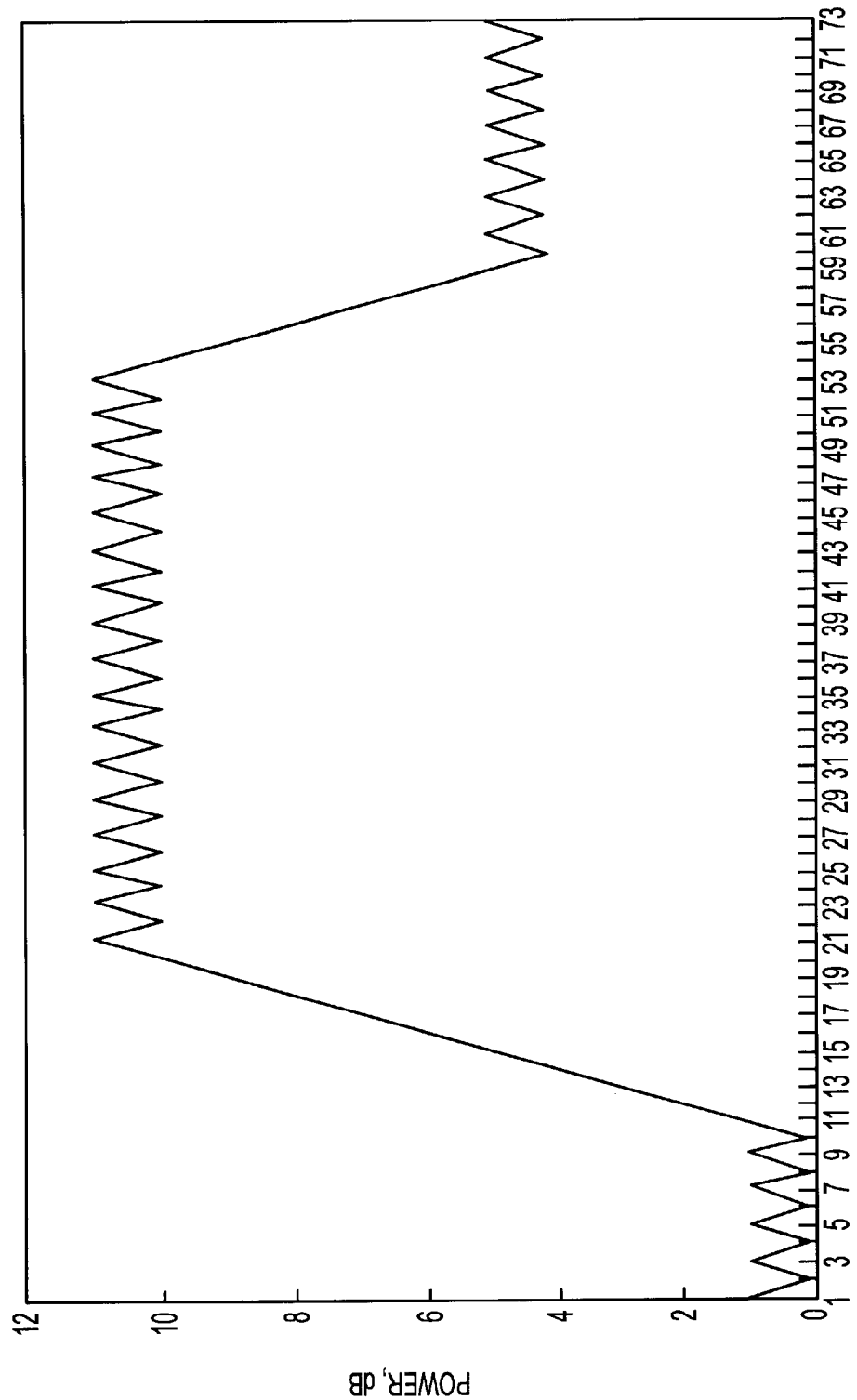
FIG. 3 is a graph showing variations in the transmission power of a mobile station.

FIG. 1 shows a first embodiment of the invention comprising a CDMA communication system having a base station 100, a mobile station 200A, and a base station controller 300. The first embodiment of the invention differs from the conventional CDMA system in that the mobile station 200A has an infinite-impulse-response (IIR) filter 207. The mobile station 200A includes an amplifier 200a, a demodulator 201, a power control information extracting circuit 202, a decoder 203, an updown decision circuit 204, a transmission amplifier 205, a transmission circuit 206 and the filter 207. The gain of the transmission amplifier 205 is controlled by a command signal from the filter 207. Filter 207 is a low pass filter which extracts a direct current signal from a signal provided by the up/down decision circuit 204 and outputs the command signal to the transmission amplifier 205.

Figure 4:
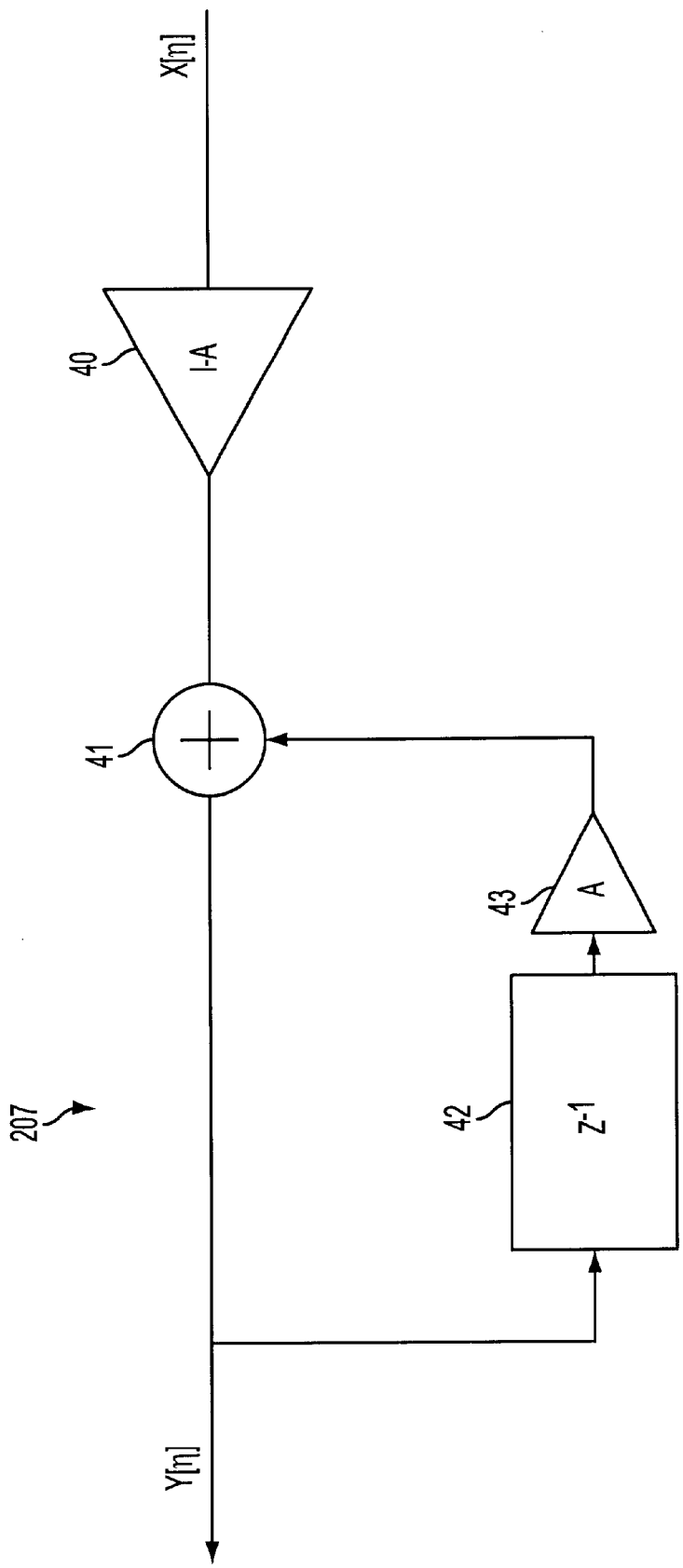
FIG. 4 is a block diagram showing a filter 207 used in first, second and third embodiments of the invention.

The filter output Y[n] is given by the equation $$Y[n]=(1-A)X[n]+A\,Y[n-1],$$

where A is the coefficient of filter 207 having a value in the range 0 to 1, X[n] is an output of the up/down decision circuit 204, and n is the number of the sample being input to the filter. As shown by the schematic diagram of FIG. 4, the filter 207 comprises a gain control element 40 having a transfer function (1−A), an adder 41 and a delay circuit 42 having a transfer function ($Z^{-1}$). The delay circuit 42 delays the output signal of the adder 41 by the time interval before samples and inputs it to a gain control circuit 43 having a transfer function A. As a result, the output signal X[n] of the up/down decision circuit 204 is input to the gain control element 40 which multiplies the coefficient (1−A) by the output (X[n]) and outputs the signal ((1−A) X[n]) to a first input of adder 41. The output signal Y[n] of the adder 41 is input to the delay circuit 42 and the signal Y(n−1) is then input to the gain control element 43 which multiplies it by A and inputs a second input signal A Y[n−1] to the adder 41. The adder 41 adds the signal ((1−A) X[n]) to the signal (A Y[n−1]) to generate the output signal Y[n].

The characteristic of the IIR filter is a function of the filter coefficient (1−A). Accordingly, the larger the filter coefficient, the slower the response time and the smaller the deviation in the power transmitted by the mobile station 200A. Similarly, the smaller the filter coefficient, the more rapid the response time and the larger the deviation of power transmitted by the mobile station. Interference between traffic channels used by a plurality of mobile stations 200A, each having a filter 207, is reduced by the CDMA system of FIG. 1 in which each mobile station 200A operates as follows.

The transmission amplifier 205 of the mobile station 200A transmits a signal to the threshold set-up circuit 303 in the base station controller 300 via the amplifier 106, demodulator 101, decoder 301 and error rate measuring circuit 302. The threshold set-up circuit 303 provides a predetermined threshold level to the power up/down decision circuit 103 which compares the threshold level with the power level received from the S/N power measuring circuit 102 of the base station 100. Thus, the base station 100 compares the received power level with the predetermined threshold level.

When the received power level exceeds the threshold level, the base station 100 sends a logical value [−1] from the power up/down decision circuit 103 to the mobile station 200A via the power control information multiplexer 104, modulator 105 and amplifier 107. The logical value [−1] commands a decrease in the transmission power of the mobile station 200A. Similarly, when the received power level does not exceed the threshold level, the base station 100 sends a logical value [+1], from the power up(down decision circuit 103 to the mobile station 200A which commands an increase in the transmission power of the mobile station 200A. Thus, the mobile station 200A performs a power control operation based on the power control information.

In the mobile station 200A, the power control information extracting circuit 202 receives the signal transmitted by the base station 100 via amplifier 200a and demodulator 201, extracts power control information from the transmission signal and inputs it to the up/down decision circuit 204. The up/down decision circuit 204 generates a command signal which commands a decrease of 1 dB in the transmission power transmitted by the transmission amplifier 205 of mobile station 200A when the power control information has logical value "−1". Similarly, the up/down decision circuit 204 provides a command signal which commands an increase of 1 dB in the transmission power of 1 dB from transmission amplifier 205 when power control information has a logical value "+1".

The command signal is supplied to the transmission amplifier 205 via the filter 207. As a result, the power control operation enables the mobile station 200A to control the transmission power.

Ideally, the power control operation should be complete when the received power level at the base station 100 matches the threshold level input to the power up/down circuit 103 by the base station controller 300. However, in actuality, the operation is not completed when the received power level at the base station 100 matches the threshold level. This is because the base station repeatedly transmits to the mobile station 200A the two types of power control information (+1 and −1). As a result, the mobile station 200A repeatedly increases and decreases its transmission power to adjust the received power level to match the threshold level.

In the power control operation, according to the first embodiment of the invention, the filter 207 extracts a direct current signal X[n] from the command signal of the up/down decision circuit 204 and provides a controlled command signal Y[n] to the transmission amplifier 205. The amplitude of the controlled command signal is approximately zero when the mobile station 200A receives alternating "−1" and "+1" signals. Accordingly, the gain of the transmission amplifier 205 is fixed to a target power level that the base station 100 requires. On the other hand, if the received power level at the base station 100 does not match the threshold level, the filter 207 provides a controlled command signal with a particular value other than zero to the transmission amplifier 205. The transmission amplifier 205 increases or decreases the transmission power based on the controlled command signal.

The first embodiment of the invention provides an improved transmission power controller in that it reduces the transmission power deviation of the mobile station 200A when the received power level at the base station 100 matches the threshold level. Accordingly, the signal received at the base station 100 from the mobile station 200A has a fixed power level. Further, a CDMA communication system using the power control operation according to the first embodiment increases the number of subscribers who can communicate at the same time.

Figure 5:
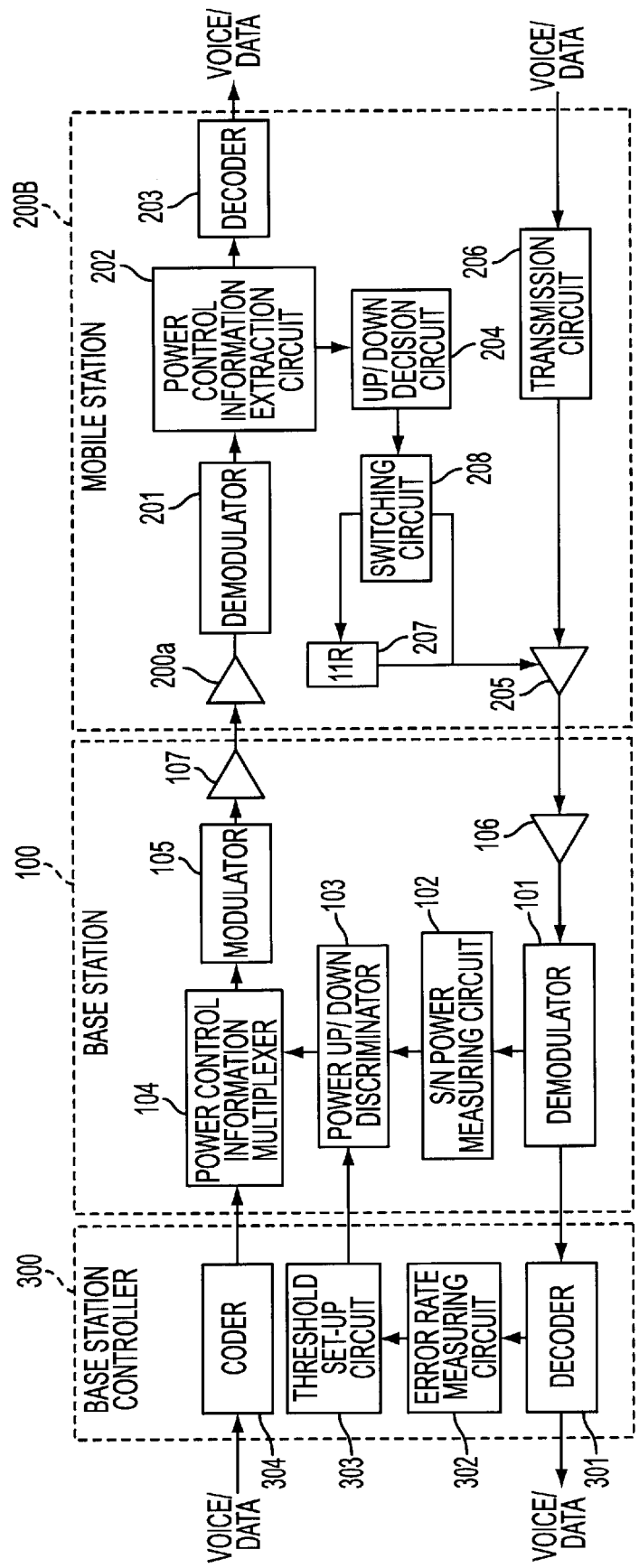
FIG. 5 is a block diagram showing a CDMA communication system according to the second embodiment of the invention.

A second embodiment of the invention is shown in FIG. 5 and comprises a CDMA communication system having the base station 100, a mobile station 200B, and the base station controller 300. The second embodiment of the invention differs from the first embodiment in that the mobile station 200B further includes a switching circuit 208. Accordingly, the mobile station 200B includes the amplifier 200a, the demodulator 201, the power control information extracting circuit 202, the decoder 203, the up/down decision circuit 204, the transmission amplifier 205, the transmission circuit 206, the filter 207 and the switching circuit 208.

The switching circuit 208 has a basic sequence which consist of a binary bit pattern such as (+1, −1, +1, −1, +1, −1), and compares the basic sequence with the received sequence of power control information. The switching circuit 208 switches the command signal provided bag the up;down decision circuit 204 to the filter 207 when the basic sequence matches the received sequence, and switches the command signal directly to the transmission amplifier 205 when the basic sequence does not match the received sequence.

The power control operation of the mobile station 200B including the switching circuit 208 is as follows. The power control information extracting circuit 202 receives a transmission signal transmitted by the base station 100 and extracts power control information from the transmission signal. Power control information is supplied to the up/down decision circuit 204. The up/down decision circuit 204 provides a negative command signal, which commands a decrease of 1 dB in the transmission power transmitted by the transmission amplifier 205 when the power control information is a logical value "−1". Similarly, the up/down decision circuit 204 provides a positive command signal, which commands an increase of 1 dB in the transmission power transmitted by the transmission amplifier 205, when the power control information is a logical value "+1". The command signal is supplied to the switching circuit 208.

Figure 6:
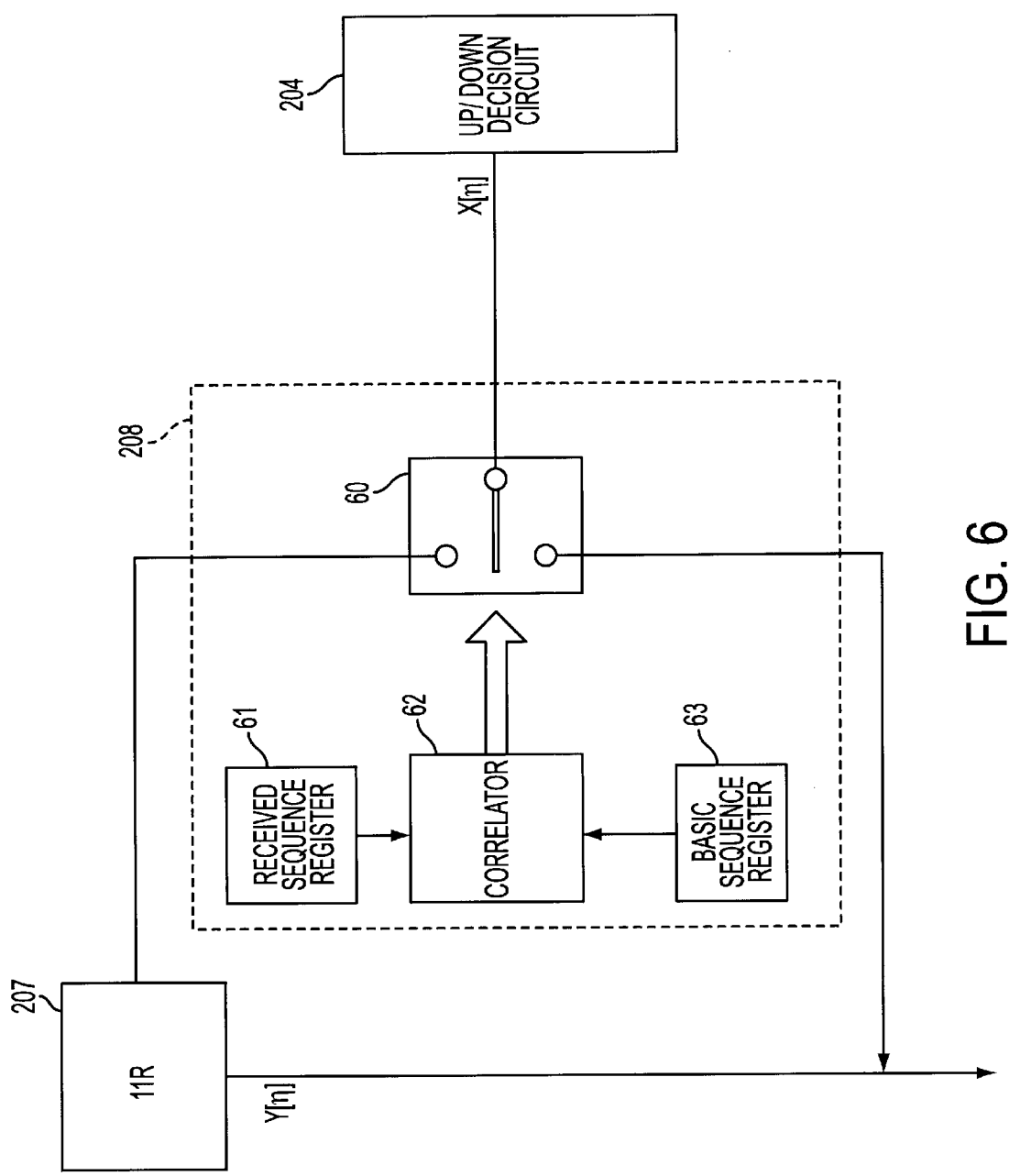
FIG. 6 is a block diagram showing a switching circuit 208 used in the second embodiment of the invention.

FIG. 6, shows a preferred embodiment of the switching circuit 208 which comprises a switching element 60, a received sequence register 61, a correlator 62, and a basic sequence register 63. The switching element 60 switches the output signal X[n] of the up/down decision circuit 204 to either the filter 207 or to the transmission amplifier 205 in accordance with the correlation result provided by the correlator 62.

The received sequence register 61 stores the received sequences of power control information within a predetermined period. The correlator 62 estimates the correlation between the received sequences of power control information stored by the received sequence register 61 and the basic sequence stored by the basic sequence register 63. If the correlation value exceeds a predetermined threshold value, that is the received sequences match the basic sequences, the switching element 60 switches the command signal X[n] provided by the up/down decision 204 to filter 207. The filter 207 performs the same operation as described in the first embodiment. In this case, since the output, signal of filter 207 is approximately zero, the gain of the transmission amplifier 205 is fixed at the target power level that the base station 100 requires.

On the other hand, if the correlation value does not exceed the predetermined threshold value, that is, the received sequence does not match the basic sequence, the switching clement 60 switches the command signal directly to the transmission amplifier 205. In this case, since the command signal has a maximum value in response to the power control information "+1" and "−1", the gain of the transmission amplifier 205 can be changed faster than with the circuit of the first embodiment shown in FIG. 1.

Summarizing, the second embodiment of the present invention provides an improved transmission power controller in which it is possible to reduce the transmission power deviation of the mobile station 200B when the received sequence of power control information matches the basic sequence. Further, when the received sequence of power control information does not match the basic sequence, the transmission power of the mobile station 200B can be changed more quickly than with first embodiment CDMA system.

Figure 7:
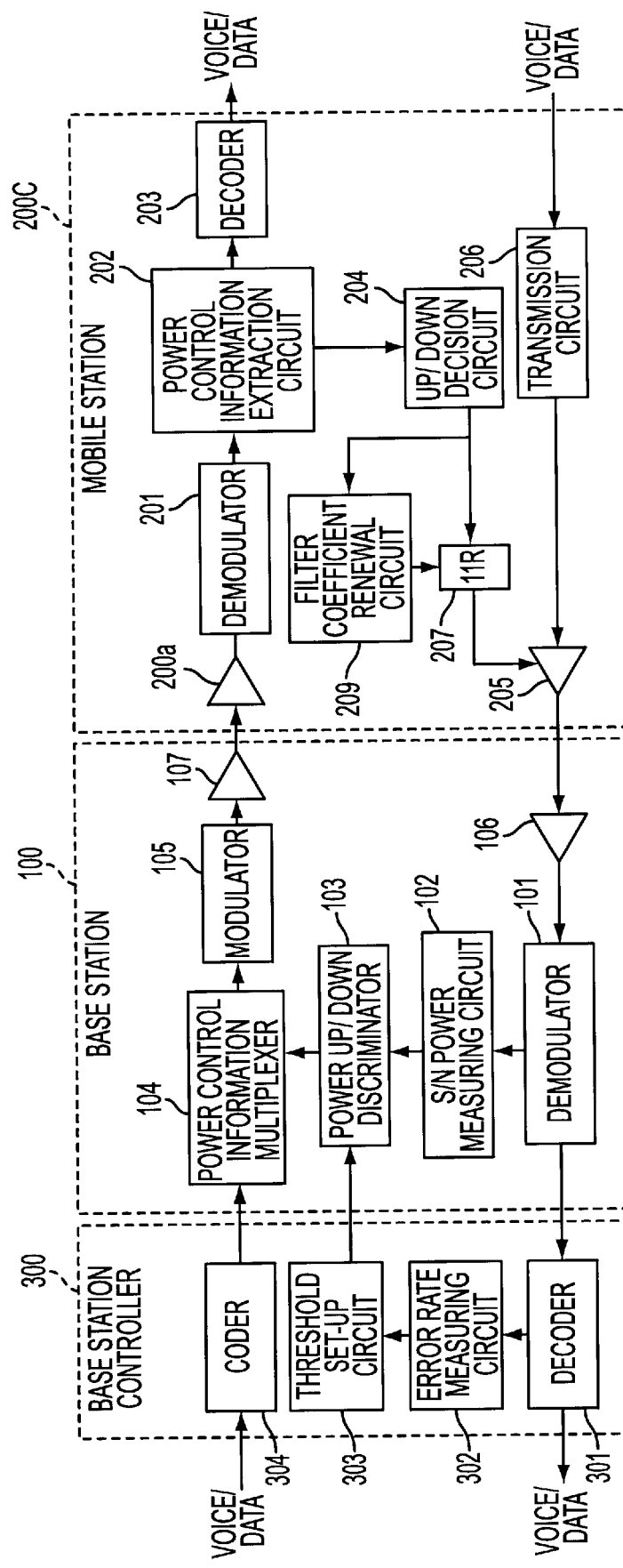
FIG. 7 is a block diagram showing a CDMA communication system according to the third embodiment of the invention.

A third embodiment of the invention is shown in FIG. 7 and comprises a CDMA communication system having the base station 100, a mobile station 200C, and the base station controller 300. The third embodiment of the invention differ from the first embodiment in that the mobile station 200C further include a filter coefficient renewal circuit 209. Accordingly, the mobile station 200C includes the amplifier 200a, demodulator 201, power control information extracting circuit 202, decoder 203, up/down decision circuit 204, transmission circuit 206, filter 207 and the filter coefficient renewal circuit 209.

The filter coefficient renewal circuit 209 is connected to the up/down decision circuit 204 and has a basic sequence, which consists of a binary bit pattern such as (+1, −1, +1, −1, −1, −1) The filter coefficient renewal circuit 209 changes the filter coefficient A of the filter 207 based on the correlation value between a received sequence of power control information and the basic sequence. That is, when the correlation value is at a maximum. the filter coefficient renewal circuit 209 selects a filter coefficient that will pass a command signal having the maximum bandwidth. When the correlation value is at a minimum, the filter coefficient renewal circuit selects a different filter coefficient that will pass a command signal having the minimum bandwidth.

Figure 8:
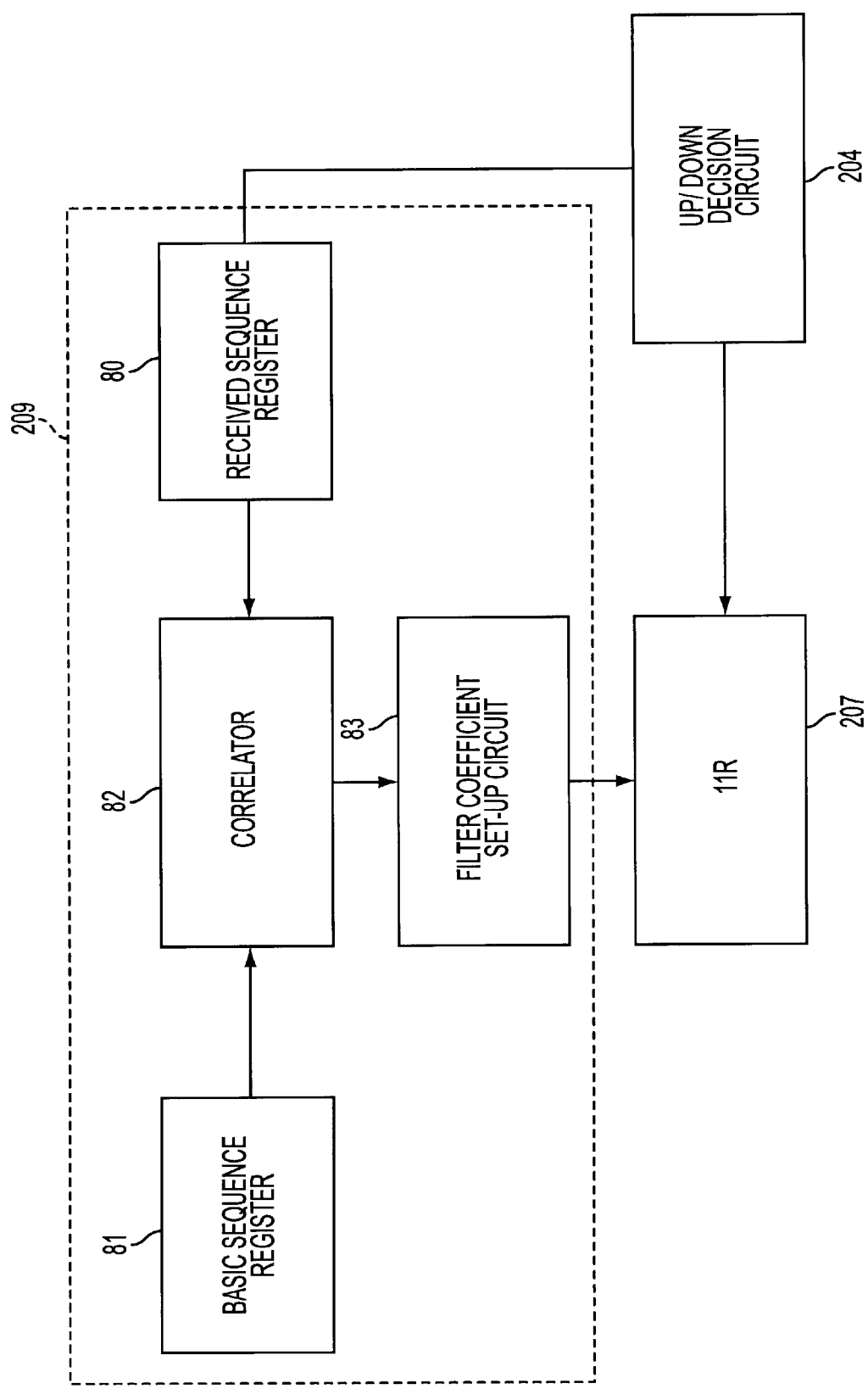
FIG. 8 is a block diagram showing a filter coefficient renewal circuit 209 used in the third embodiment of the invention.

FIG. 8 shoals a preferred embodiment of the filter coefficient renewal circuit 209. Circuit 209 has a received sequence register 80, a basic sequence register 81, a correlator 82, and a filter coefficient set-up circuit 83. The received sequence register 80 stores a received sequence of power control information within a predetermined period and the basic sequence register 81 stores a basic sequence such as (+1, −1, +1, −1, +1, −1).

The power control operation of the mobile station 200C including the filter coefficient renewal circuit 209 as illustrated in FIGS. 7 and 8 will now be explained. The correlator 82 estimates the correlation value between the received sequence of power control information and the basic sequence, and supplies this value to the filter coefficient set-up circuit 83. When the received sequence of power control information completely matches the basic sequence (+1, −1, +1, −1, +1, −1), the filter coefficient set-up circuit 83 selects a filter coefficient that will pass a command signal having the narrowest bandwidth. Hence, the amplitude of the command signal is approximately zero, and the gain of the transmission amplifier 205 is fixed to a target power level that the base station 100 requires. When the received sequence of power control information is similar to the basic sequence, the filter coefficient set-up circuit 83 selects a filter coefficient that will pass a command signal having a comparatively narrow bandwidth. Hence, the amplitude of the command signal is a relatively small value, and the transmission amplifier 205 is slowly controlled within a range having a low value.

When the received sequence of power control information is different from the basic sequence, the filter coefficient set-up circuit 83 selects a filter coefficient that will pass the command signal having the broadest bandwidth. Hence, the amplitude of the command signal is similar to the output signal of the up/down decision circuit 204, and the output of the transmission amplifier 205 is controlled rapidly to the target power level that the base station 100 requires.

Summarizing, the third embodiment of the invention provides an improved transmission power controller in which it is possible to reduce the transmission power deviation of the mobile station 200C when the received sequence matches the basic sequence. Further, when the received sequence of power control information does not match the basic sequence, the transmission power of the mobile station 200C can be changed more quickly than with the first embodiment. That is, the transmission power of the mobile station 200C matches what the base station 100 requires. Further, since the filter coefficient renewal circuit 209 selects one of the filter coefficients based on the correlation between the received sequence and the basic sequence, the transmission power control of the mobile station 200C is carried out in smaller increments than occurs with the first and second embodiments.

Figure 9:
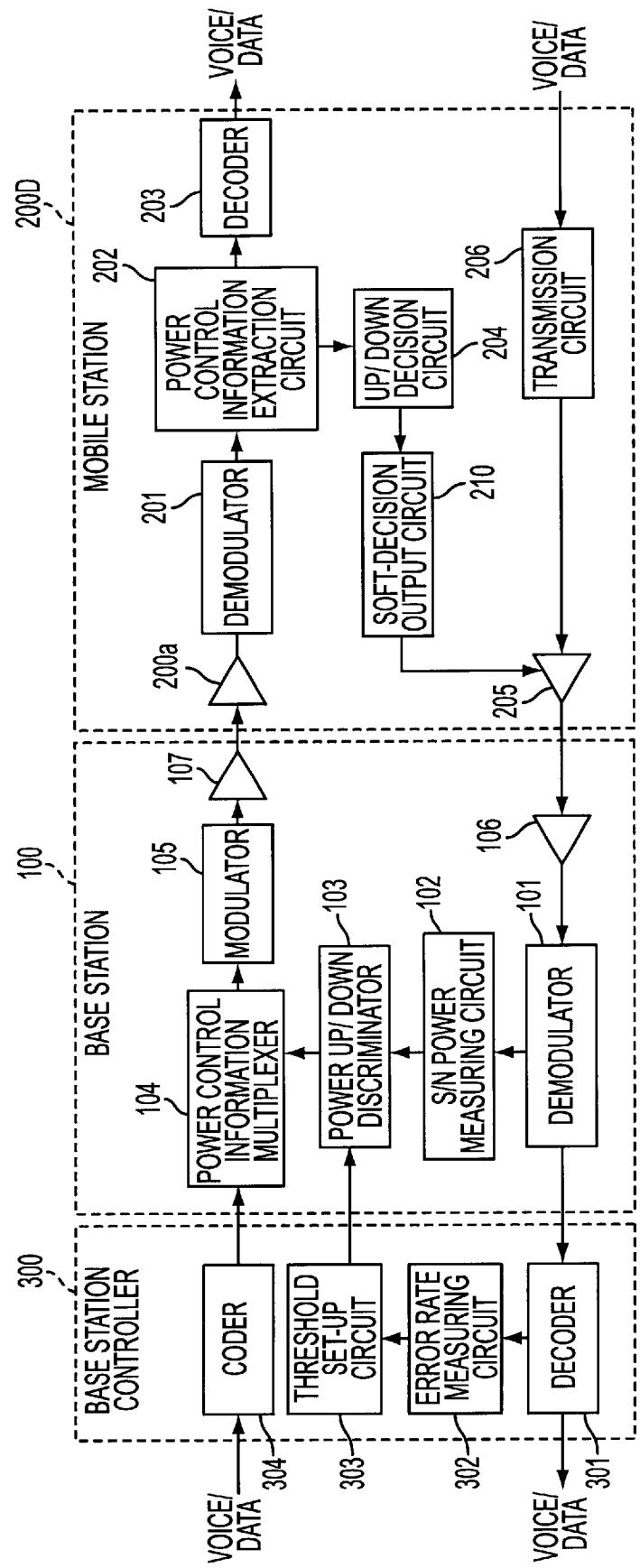
FIG. 9 is a block diagram showing a CDMA communication system according to a fourth embodiment of the invention.

FIG. 9 shows a CDMA communication system comprising the base station 100, mobile station 200D, and the base station controller 300 with regard to a fourth embodiment of the present invention. The difference between the fourth embodiment and the first embodiment is that the mobile station 200D has a soft-decision output circuit 210 instead of the filter 207. Accordingly, the mobile station 200D includes the demodulator 201, power control information extracting circuit 202, the decoder 203, the up/down decision circuit 204, the transmission amplifier 205, the transmission circuit 206 and the soft-decision circuit 210.

Figure 10:
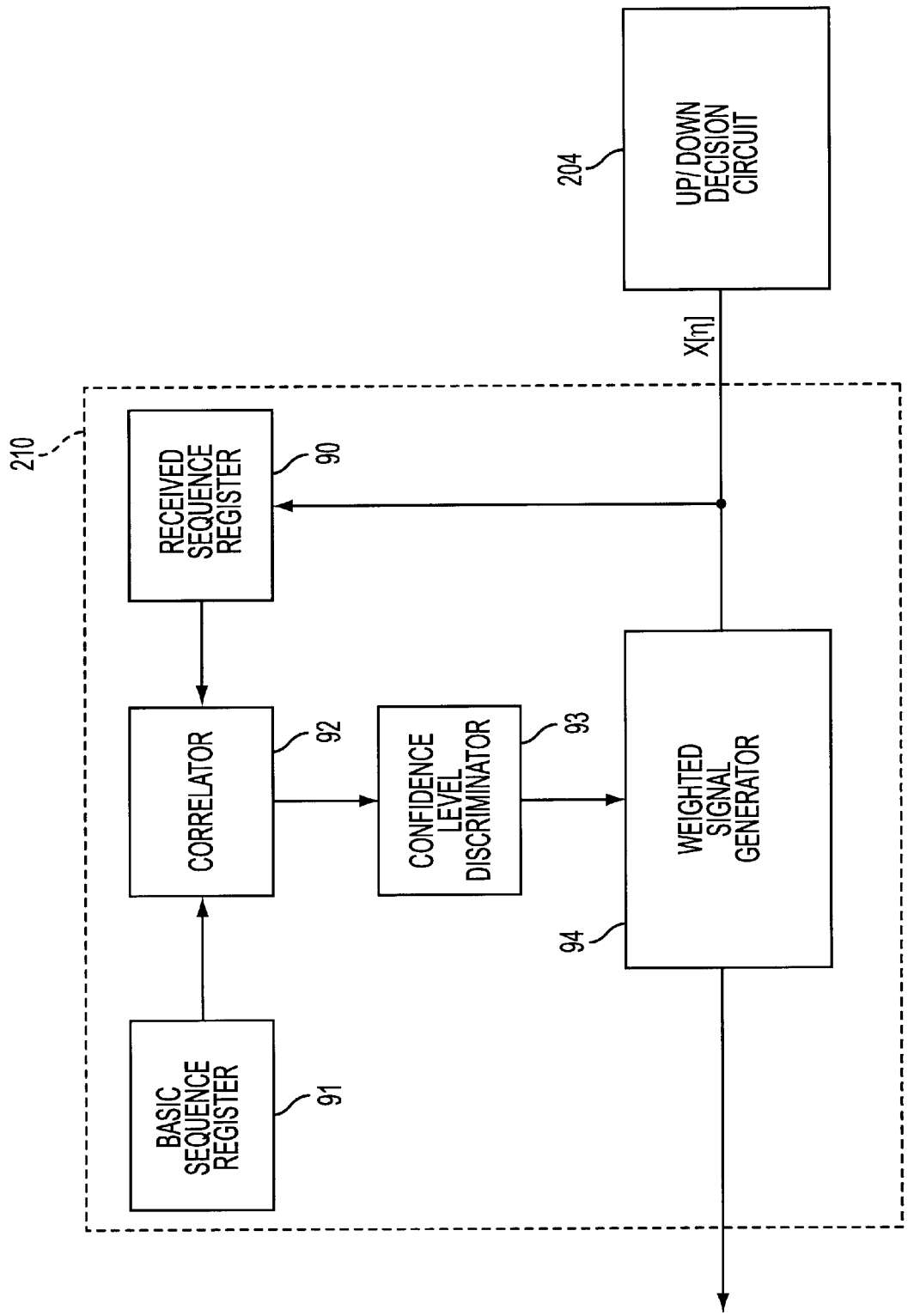
FIG. 10 is a block diagram showing a soft-decision circuit 210 used in the fourth embodiment of the invention.

FIG. 10 shows a preferred embodiment of the soft-decision circuit 210. The soft-decision circuit 210 comprises a received sequence register 90, a basic sequence register 91, a correlator 92, a confidence level discriminator 93, and a weighted signal generator 94. The received sequence a register 90 stores a received sequence of power control information within a predetermined period and the basic sequence register 91 stores a basic sequence such as (+1, −1, +1, −1, +1, −1).

The power control operation of the mobile station 200D including the soft-decision circuit 210 as illustrated in FIGS. 9 and 10 will now be explained. The correlator 92 estimates the correlation value between the received sequence of power control information provided by the up/down decision circuit 204 and the basic sequence and supplies it to the confidence level discriminator 93. The confidence level discriminator 93 calculates a confidence level based on the correlation value and a high correlation period defined by the period during which a high correlation value is maintained over a predetermined value period. The weighted signal generator 94 produces a weighted command signal based on the confidence level.

When the received sequence of past power control information matches the basic sequence, the weighted signal generator 94 changes the filter coefficient to a smaller value in order to suppress the amplitude of the command signal of the up/down decision circuit 204. Further, when the next received sequence matches the basic sequence, the weighted signal generator 94 reduces further the filter coefficient thereby further suppressing the amplitude of the command signal. As a result, during a high confidence level period, the weighted signal generator 94 reduces gradually the amplitude of the command signal.

For example, in a normal mode, the range through which the power output of the transmission amplifier 205 changes is "521 1 dB" in response to a power control information signal of "521 1". However, when the received information signal continues to match the basic sequence, the range through which the power output of the amplifier 205 may change is from "521 1.00 dB" to "521 0.75 dB" and then from "521 0.75 dB" to "521 0.50 dB" in response to sequential power control information signals of "521 1".

That is, when two sequential power control information signals of "521 1" are received which match the basic sequence, the weighted signal generator 94 suppresses the amplitude of the first command signal causing a change in the power output of the transmission amplifier 205 from "521 1.00 dB" to "521 0.75 dB", and suppresses the amplitude of the second command signal from "521 0.75 dB" to "521 0.50 dB", as mentioned above. Also, if the following received sequence continues to match the basic sequence, the weighted signal generator 94 suppresses the amplitude of the command signal. For example, the output of amplifier 205 may be changed from "521 0.50 dB" to "521 0.25 dB" in response to a power control information signal of "521 1". However, when the subsequent received sequence does not match the basic sequence, the weighted signal generator 94 returns gradually the amplitude of the control signal to its value in the normal mode.

As set forth above, the fourth embodiment of the present invention provides an improved transmission power controller whereby it is possible to reduce gradually the deviation in the power output of the transmission amplifier 205 of the mobile station 200D when the received power level at the base station 100 matches the threshold thereof Further, the transmission power control of the mobile station 200D is carried out with smaller changes than is the case with the first and second embodiment.

While the present invention has been described with reference to the particular illustrative embodiments, it is not to be restricted by those embodiments. It is to be appreciated that those skilled in the art can change or modify the embodiments without departing from the scope thereof. For example, in the second and third embodiments, it has been described host to estimate the correlation value between the received sequence provided by the up/down decision circuit 204 and the basic sequence. However it is possible to estimate the correlation value based on counting the number of reverses between the plus signs and minus signs of the power control information signal instead of the above mentioned correlation. The third embodiment describes how to alter the filter coefficient and change the gain of the transmission amplifier 205 based on the correlation value. However, if there are a plurality of filters having independent filter characteristics, it is possible to select a filter based on the correlation value.

In the fourth embodiment, it has been described how to suppress/expand the amplitude of the command signal from the up/down decision circuit 204 gradually. That is, change in the amplitude is increments of "0.75 dB", "0.50 dB", or "0.25 dB" in response to changes in the power control information signal of "+1" and "−1". It is also possible to adapt another fixed increment in the rate of adaptive change in response to the confidence level.

In the embodiments described above, the power control operation occurs in the mobile station. However, it is possible to adapt the operation to a base station having a radio transmission function. Also, it has been described that power control information is transmitted from a base station to a mobile station in the form of a binary signal (+1, −1). However, it is possible to employ multiple power control information signals instead of the binary signal.

What is claimed is:

1. A transmission power controller including a transmission amplifier located in a first station and having an adjustable gain, said transmission amplifier controlling the power transmitted from the first station to a second station in accordance with a power control information signal transmitted from the second station, comprising:

a power control information extracting circuit for receiving the power control information signal from the second station and extracting information therefrom;

an up/down decision circuit coupled to said power control information extracting circuit for generating sequential output signals in accordance with the information extracted from said power control information extracting circuit, each of the sequential signals output by said up/down decision circuit including a low frequency band component; and a filter interposed between said up/down decision circuit and the transmission amplifier, said filter extracting the low frequency band components from the sequential output signals of said up/down decision circuit, generating command signals therefrom, and applying said command signals to the transmission amplifier to control the gain thereof.

2. A transmission power controller according to claim 1 wherein said transmission power controller further comprises:

a switch for coupling the output of said up/down decision circuit to one of the transmission amplifier and said filter; and an estimating circuit for estimating whether the power transmitted by said transmission amplifier matches a target power level set by said second station, said switch switching the output of said up/down decision circuit to said filter when the power transmitted by said transmission amplifier matches said target power level and to said transmission amplifier when the power transmitted by said transmission amplifier does not match said target power level.

3. A transmission power controller according to claim 1 wherein said first station is a mobile station and said second station is a base station of a CDMA communication system.

4. A transmission power controller according to claim 1, wherein said power control information signal transmitted from said second station comprises binary logical values even when the power transmitted from said first station is maintained.

5. A transmission power controller according to claim 1, wherein the information extracted by said power control information extracting circuit comprises binary logical values, and wherein said up/down decision circuit accumulates said binary logical values from said power control information extracting circuit to obtain said sequential output signals.

6. A transmission power controller including a transmission amplifier located in a first station and having an adjustable gain, said transmission amplifier controlling the power transmitted from the first station to a second station in accordance with a power control information signal transmitted from the second station, comprising:

a power control information extracting circuit for receiving the power control information signal from the second station and extracting information therefrom;

an up/down decision circuit coupled to said power control information extracting circuit for generating sequential output signals in accordance with the information extracted from said power control information extracting circuit, each of the sequential signals output by said up/down decision circuit including a low frequency band component; and a filter interposed between said up/down decision circuit and the transmission amplifier, said filter extracting the low frequency band components from the sequential output signals of said up/down decision circuit, generating command signals therefrom, and applying said command signals to the transmission amplifier to control the gain thereof;

wherein said filter includes:
an adder having first and second inputs and an output, the output of said adder being coupled to the transmission amplifier;
a first gain control element having a first filter coefficient (1-A), where (A) is between 0 and 1, said first gain control element inputting a product of a sequential output signal of said up/down decision circuit and said first filter coefficient to the first input of said adder;
a second gain control element having a second filter coefficient (A), said second gain control element being connected to the second input of said adder; and
a delay circuit interposed between the output of said adder and an input of said second gain control element, said delay circuit inputting to said second gain control element the output of said adder during the interval preceding the interval when said first gain control element inputted to the first input of said adder the product of said sequential output signal of said up/down decision circuit and said first filter coefficient, said second gain control element inputting to said adder the product of the output of said delay circuit and said second filter coefficient.

7. A transmission power controller including a transmission amplifier located in a first station and having an adjustable gain, said transmission amplifier controlling the power transmitted from the first station to a second station in accordance with a power control information signal transmitted from the second station, comprising:

a power control information extracting circuit for receiving the power control information signal from the second station and extracting information therefrom;
an up/down decision circuit coupled to said power control information extracting circuit for generating sequential output signals in accordance with the information extracted from said power control information extracting circuit, each of the sequential signals output by said up/down decision circuit including a low frequency band component; and
a filter interposed between said up/down decision circuit and the transmission amplifier, said filter extracting the low frequency band components from the sequential output signals of said up/down decision circuit, generating command signals therefrom, and applying said command signals to the transmission amplifier to control the gain thereof;

wherein said estimating circuit comprises:
a received sequence register for storing the sequential output signals of said up/down decision circuit for a predetermined period;
a basic sequence register for storing a predetermined basic sequence indicating alternatively power up and power down operations; and
a correlator coupled to said switch for comparing the outputs of said received and basic sequence registers and estimating a correlation therebetween, said correlator controlling said switch to switch the output of said up/down decision circuit to said filter when the power transmitted by said transmission amplifier matches said target power level and to said transmission amplifier when the power transmitted by said transmission amplifier does not match said target power level.

8. A transmission power controller including a transmission amplifier located in a first station and having an adjustable gain, said transmission amplifier controlling the power transmitted from the first station to a second station in accordance with a power control information signal transmitted from the second station, comprising:

a power control information extracting circuit for receiving the power control information signal from the second station and extracting information therefrom;
an up/down decision circuit coupled to said power control information extracting circuit for generating sequential output signals in accordance with the information extracted from said power control information extracting circuit, each of the sequential signals output by said up/down decision circuit including a low frequency band component;
a filter, having a filter coefficient, interposed between said up/down decision circuit and the transmission amplifier, said filter extracting the low frequency band components from the sequential output signals of said up/down decision circuit, generating command signals therefrom, and applying said command signals to the transmission amplifier to control the gain thereof; and
a filter coefficients renewal circuit coupled to the output of said up/down decision circuit and to the input of said filter, said filter coefficient renewal circuit comprising
a received sequence register for storing the sequential output signals of said up/down decision circuit for a predetermined period;
a basic sequence register for storing a predetermined basic sequence indicating alternatively power up and power down operations;
a correlator for comparing the outputs of said received and basic sequence registers; and
a filter coefficient set-up circuit interposed between said correlator and said filter for selecting a filter coefficient in accordance with the output of said correlator.

9. A transmission power controller having a transmission amplifier for adjusting transmission power based on a power control information signal transmitted from a base station comprising:

a power control information extracting means for extracting said power control information signal,
an up/down decision means for producing a command signal to control a gain of said transmission amplifier in response to said power control information signal, said command signal comprising sequential signals based on said power control information signal extracted by said power control information extracting means,
a filter coefficient renewal means for estimating a matching status between actual transmission power of said transmission amplifier and target power level that said base station requires, and for renewing a filter coefficient based on said matching status, and
a filtering means for extracting a predetermined frequency band signal from said command signal based on said filter coefficient and for controlling a gain of said transmission amplifier based on said extracted predetermined frequency band signal.

10. A transmission power controller according to claim 9, wherein said matching status in said filter coefficient renewal means is estimated by a correlation between a received sequence of said power control information signal and a predetermined basic sequence indicating alternatively a power up operation and a power down operation.

11. A transmission power controller as in claim 9, wherein said power control information signal transmitted from said base station comprises binary logical values even when the power transmitted to said base station is maintained.

12. A transmission power controller according to claim 9, wherein the power control information signal extracted by said power control information extracting means comprises binary logical values, and wherein said up/down decision means accumulates said binary logical values from said power control information signal to obtain said sequential signals.

13. A transmission power controller having a transmission amplifier for adjusting transmission power based on a power control information signal transmitted from a base station comprising:

a power control information extracting means for extracting said power control information signal, an up/down decision means for producing a command signal to control a gain of said transmission amplifier in response to said power control information signal, said command signal comprising sequential signals based on said power control information signal extracted by said control information extracting means, and soft-decision output means for estimating a matching status between actual transmission power and target power level that said base station requires, and for suppressing said command signal with a predetermined changing range based on said matching status, wherein said matching status in said soft-decision output means is estimated by a correlation between a received sequence of said power control information signal and a predetermined basic sequence indicating alternatively a power up operation and a power down operation.

\* \* \* \* \*